US012711546B1

(12) United States Patent
Liang et al.

(10) Patent No.: US 12,711,546 B1
(45) Date of Patent: Aug. 18, 2026

(54) DATA AGGREGATION AND NORMALIZATION FOR EXCHANGE OF ASSETS

(71) Applicant: Gemini IP, LLC, New York, NY (US)

(72) Inventors: Hu Liang, Los Altos, CA (US); John Burnett, Denver, CO (US)

(73) Assignee: Gemini IP, LLC, New York, NY (US)

( * ) Notice: Subject to any disclaimer, the term of this patent is extended or adjusted under 35 U.S.C. 154(b) by 99 days.

(21) Appl. No.: 17/987,599

(22) Filed: Nov. 15, 2022

(51) Int. Cl.
*G06Q 40/04* (2012.01)

(52) U.S. Cl.
CPC .................................... *G06Q 40/04* (2013.01)

(58) Field of Classification Search
CPC ...................................................... G06Q 40/04
See application file for complete search history.

(56) References Cited

U.S. PATENT DOCUMENTS 6,026,381 A * 2/2000 Barton, III ............. G06Q 40/06 707/E17.089
10,354,325 B1 * 7/2019 Skala .................. G06Q 20/065
10,649,988 B1 * 5/2020 Gold ...................... G06F 3/067
2003/0144978 A1 * 7/2003 Zeine ...................... G06N 5/04 706/47
2007/0033209 A1 * 2/2007 Magee .................... G06F 16/88 707/999.102
2007/0239577 A1 * 10/2007 Grody .................... G06Q 40/04 705/35
2008/0168025 A1 * 7/2008 Kratz ................. G06F 16/2454
2009/0210335 A1 * 8/2009 Asher .................... G06Q 40/00 705/35
2010/0211525 A1 * 8/2010 West ...................... G06Q 40/00 715/769
2011/0153552 A1 * 6/2011 Thomas ................. G06Q 40/04 707/607
2011/0166982 A1 * 7/2011 Cole ...................... G06Q 40/06 705/37

(Continued)

FOREIGN PATENT DOCUMENTS

CA 2779202 A1 * 5/2011 ............ G06Q 40/06
EP 4273781 A1 * 11/2023 ............ G06Q 40/04

(Continued)

OTHER PUBLICATIONS

From Legacy Documents to XML: A Conversion Framework (Year: 2005).*

(Continued)

*Primary Examiner* — James H Miller
(74) *Attorney, Agent, or Firm* — Lee & Hayes, P.C.

(57) ABSTRACT

Systems and methods for aggregating and normalizing market data from multiple types of asset exchanges are described herein. For example, the system (e.g., an exchange platform) may generate connections with different types of exchanges (e.g., traditional exchanges, over the counter (OTC) markets, etc.), enabling communication between the exchanges and the system via a high speed and low latency network. The system may receive, normalize, parse, and store all of asset data available from the various exchanges and provide the asset data in real time to the various users (e.g., traders) inquiring about the asset data and/or attempting to execute a transaction via a client device.

14 Claims, 8 Drawing Sheets

(56) References Cited

U.S. PATENT DOCUMENTS

2011/0178915 A1* 7/2011 Vinokour ............... G06Q 40/04 705/37
2012/0197914 A1* 8/2012 Harnett ................. G06F 16/332 707/755
2012/0259761 A1* 10/2012 Subramanian ......... G06Q 40/04 705/37
2014/0039970 A1* 2/2014 Faridy ................ G06Q 10/0633 705/7.27
2015/0106248 A1* 4/2015 Chapman ............... G06Q 40/04 705/37
2015/0213444 A1* 7/2015 McEntee ............ G06Q 20/3825 705/44
2017/0235890 A1* 8/2017 Chen ...................... G06Q 10/06 705/3
2017/0270598 A1* 9/2017 Ram .................. G06Q 30/0641
2019/0287174 A1* 9/2019 Black .................... H04L 9/3239
2020/0074421 A1* 3/2020 Asver .................. G06Q 20/367
2020/0211087 A1* 7/2020 Pierce ................ G06Q 30/0633
2022/0083878 A1* 3/2022 Nguyen ................. G06N 3/091
2023/0015846 A1* 1/2023 Toffey .................... G06Q 40/04
2023/0351503 A1* 11/2023 Melachrinos ........ G06Q 20/389

FOREIGN PATENT DOCUMENTS

WO WO-02097574 A2 * 12/2002 ............. G06Q 40/06
WO WO-2010077829 A1 * 7/2010 ............. G06Q 40/00
WO WO-2011053404 A1 * 5/2011 ............. G06Q 40/06
WO WO-2019178400 A1 * 9/2019 ............. G06Q 40/06
WO WO-2021231408 A1 * 11/2021 ............. G06Q 40/06

OTHER PUBLICATIONS

Lewis Carroll Resources, Lewis Carroll Ciphers (Year: 1836).*
FlexParser—The adaptive log file parser for continuous results in a changing world (Year: 2021).*
Machine Learning in Finance (Year: 2020).*
Leskovec, Jure, Anand Rajaraman, and Jeffrey David Ullman. "Mining of Massive Datasets." (2019) (Year: 2019).*
Deep Learning for Market by Order Data (Year: 2021).*

* cited by examiner

DATA AGGREGATION AND NORMALIZATION FOR EXCHANGE OF ASSETS

BACKGROUND

Exchange platforms provide retail and institutional customers access to participate in transactions involving cryptocurrencies of different types, foreign currencies, and/or other tradable assets. The large variety of types of tradable assets as well as the different exchanges that offer them result in a variety of different formats or file types to process by the exchange platform. The variety of ways in which this data may be received and the different types of data may cause meaningful analysis and/or processing of the data to take an unacceptable amount of time with respect to a pending transaction that needs to be executed based on real time values associated with the tradable assets. Described herein are improvements in technology and solutions to technical problems that can be used to, among other things, aggregate and normalize market data that will be used to execute a transaction in near real time.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
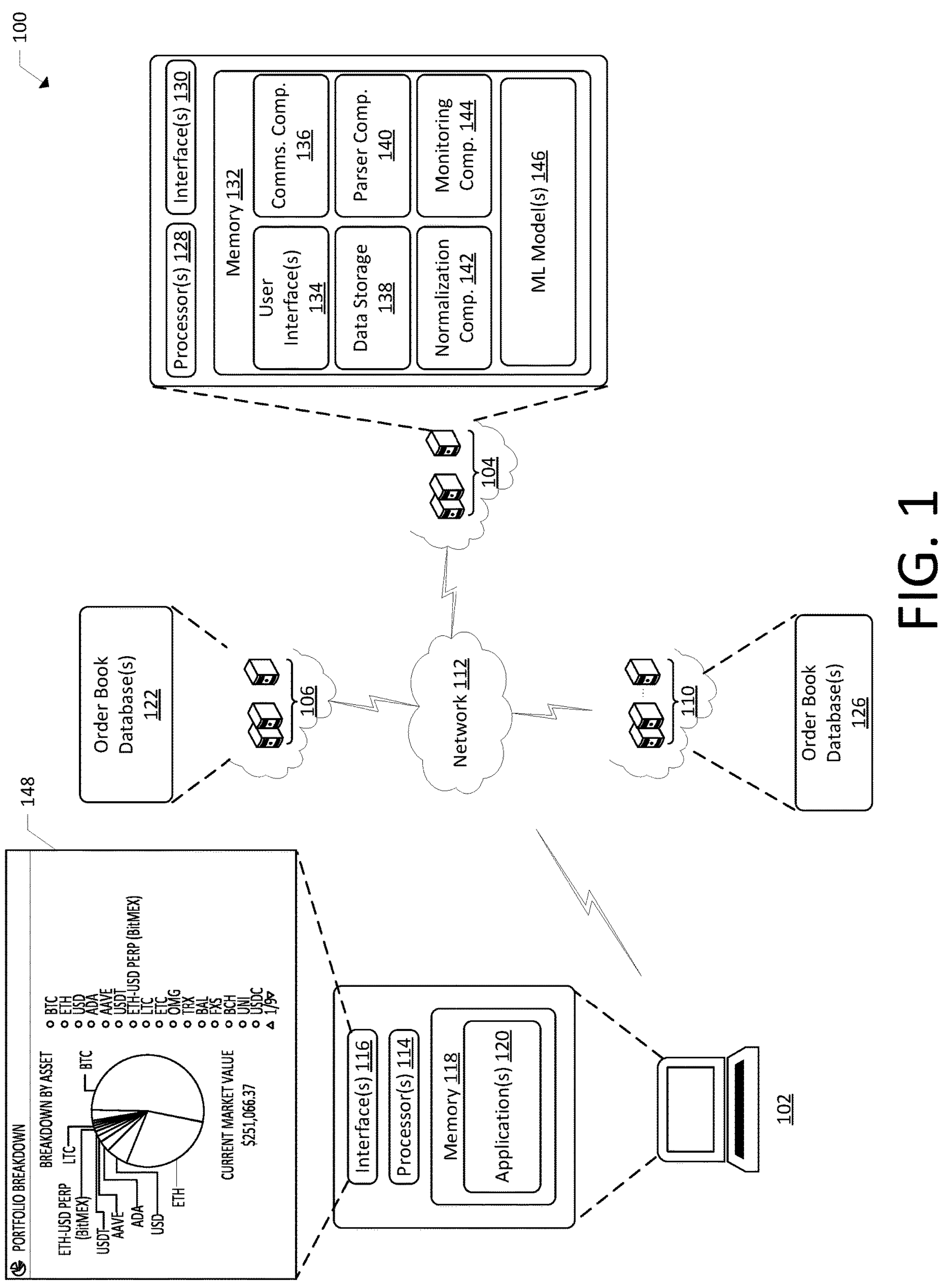
FIG. 1 illustrates a schematic diagram of an example environment for aggregating and normalizing data.

Systems and methods for aggregating and normalizing market data from multiple types of asset exchanges are described herein. For example, an exchange platform including a system may have access to one or more databases of one or more asset exchanges from which the exchange platform may obtain asset data. Such data may be used by the system for one or more purposes, such as determining values of assets in which the asset exchanges are listing (e.g., exchange rates for different assets). For example, each asset exchange may include an order book that lists the associated prices for trading different assets (e.g., Bitcoin (BTC) in exchange for United States Dollar (USD)). These order books may include multiple types of trades (e.g., transactions) involving multiple types of assets (e.g., cryptocurrencies of different types, foreign currencies, etc.) with each type of trade including the associated value at which the asset exchange is willing to sell or buy the desired asset (e.g., the exchange rate). However, entities attempting to execute a trade (e.g., asset managers, stock traders, etc.) require accurate real-time updates of the exchange rates for each executable trade. The massive amount of types of trades (e.g., BTC for USD, USD for Ethereum (ETH), ETH for BTC, etc.) as well as the varying types of platforms provided by each individual asset exchange offering the trade results in delays in updates and, in some cases, complete failure of a communication line between the trader and the asset exchange. For example, lagging updates to exchange rates and/or failure to update exchange rates in real time may result in slippage experienced by the trader. That is, the trader may experience a difference between the expected price of an order and the price when the order actually executes. The slippage percentage shows how much the price for a specific asset has moved. Due to the volatility of cryptocurrency, the price of an asset can fluctuate often depending on trade volume and activity.

Additionally, in many cases the different types of exchanges (e.g., traditional exchange, over the counter (OTC) market, etc.) may not be configured to communicate (e.g., trade) with one another due to the differences in types of executable trades they offer. For example, a traditional exchange (e.g., a stock exchange, auction-based exchange, etc.) may offer different financial instruments to be traded, including equities, assets, and bonds. These traditional exchanges bring corporations and/or other entities offering tradeable assets together with investors. The exchange tracks the flow of orders for each stock, and the flow of supply and demand establishes a stock's price. For example, if a stock's bid price is $40, this means an investor is indicating to the exchange that they are willing to buy the stock for $40. At the same time, an asking price of $41 may be put forth, meaning another investor is willing to sell the stock for $41. In contrast, an OTC market enables participants to trade directly between two parties, without the use of a central exchange or other third party.

The presently-disclosed systems and methods may be utilized to aggregate and normalize market data from multiple types of asset exchanges, and provide functionality to allow a user (e.g., assets trader) to receive real-time updates to exchange rates between varying types of assets. For example, the system (e.g., an exchange platform) may generate multiple connections with multiple asset exchanges, wherein individual connections of the multiple connections connect the exchange platform with individual asset exchanges of the multiple exchanges. For example, a communication component may establish a number of individual communication connections (also referred to as "connections") with existing asset exchanges offering executable trades for varying types of assets. These connections may enable communication between the asset exchanges and the system via a high speed and low latency network. In some cases, a monitoring component of the system may monitor a status of these connections to determine if a connection has failed and/or otherwise is operating below a threshold performance rate (e.g., operating with throughput that is below a threshold).

In some examples, the system may access a respective order book associated with each of the multiple asset exchanges. For example, each of the asset exchanges with which the system is in communication via the connections may store and manage a respective order book. Each of the order books may include an electronic documentation of an asset's buy and sell activity on the asset exchange, such as a cryptocurrency exchange. In some cases, the order book stores record data of buy and sell orders, which can in turn provide the system with particular exchange rates used by the asset exchange for particular assets.

In some cases, the system may obtain asset data from each of the respective order books, the asset data including at least one asset identifier associated with an asset and at least one value associated with the asset. For example, each order book may include a list of the currently open buy and sell orders for an asset. Each asset exchange may use different asset identifiers to identify a particular asset type. For example, a first asset exchange may identify Bitcoin as "BTC" while a second asset exchange identifies Bitcoin as "XBT." Similarly, a third asset exchange may identify Dogecoin as "DOGE" while another asset exchange may identify Dogecoin as "XDG." These varying identities used to identify the same asset type may be received by the system and stored to be normalized, as discussed in the steps below.

Other examples of assets, including digital math-based assets, include Ethereum, Ripple, Cardano, Litecoin, Neo, Stellar, Iota, Nem, Dash, Monero, Lisk, Qtum, Zcash, Nano, Steem, Eos, Tron, Bytecoin, Verge, Siacoin, Stratis, Bitshares, Waves, Decred, Ardor, Hshare, Komodo, Electroneum, Ark, Digibyte, E-Coin, Zclassic, Byteball Bytes, Pivx, Cryptonex, Gxshares, Syscoin, Bitcore, Factom, Monacoin, Zcoin, Smartcash, Particl, Nxt, Reddcoin, Emercoin, Experience Points, Neblio, Nexus, Blocknet, Gamecredits, Digitalnote, Vertcoin, Bitcoindark, Bitcoin Cash, Skycoin, Zencash, Nav Coin, Achain, Htmlcoin, Ubiq, Bridgecoin, Peercoin, Paccoin, Xtrabytes, Einsteinium, Asch, Counterparty, Bitbay, Viacoin, Rise, Guiden, Ion, Metaverse Etp, Lbry Credits, Crown, Electra, Burst, Minexcoin, Aeon, Salus, Decent, Cloakcoin, Pura, Ecc, Deeponion, Groestlcoin, Lykke, Steem Dollars, I/O Coin, Shift, Hempcoin, Mooncoin, Dimecoin, Namecoin, Feathercoin, Diamond, Spectrecoin, Filecoin, Tezos, Ppcoin, Tonal Bitcoin, Ixcoin, Devcoin, Freicoin, IOcoin, Terracoin, Liquidcoin, Bbqcoin, Bitbars, Gas, Tether, Libra, Ether Classic and Phenixcoin, to name a few. In embodiments, digital assets, such as Bitcoin, Ether, or Diem, (to name a few) may be accepted in trade by merchants, other businesses, and/or individuals in many parts of the world.

Assets may also include "tokens," which like other digital assets can represent anything from loyalty points to vouchers and IOUs to actual objects in the physical world. Tokens can also be tools, such as in-game items, for interacting with other smart contracts. A token is a "smart contract" running on top of a blockchain network (such as the Ethereum Blockchain, the Bitcoin Blockchain, the Neo Blockchain, the Stellar Blockchain, the Libra Blockchain, to name a few). As such, it is a set of code with an associated database.

In some examples, the system may apply a normalization function to the asset identifier and generate, based at least in part on applying the normalization function to the asset identifier, a standard representation associated with the asset based on an asset type. For example, the standard representation may represent an asset identifier used by the system for a particular asset type, regardless of what asset identifier is being used in the order books of the various asset exchanges for that particular asset type. In some cases, a normalization component may utilize the normalization function and receive the asset identifier from the asset exchange as an input, apply the normalization function to the asset identifier, and output the standard representation of the asset type with which the asset identifier corresponds to. In some cases, the asset identifier used by the asset exchange for the particular asset type may be the same as the standard representation used by the system for representing that asset type. For example, a first asset exchange may identify Bitcoin as "BTC" while a second asset exchange identifies Bitcoin as "XBT." The system, when performing operations and/or providing access to one or more users, may have a standard representation of Bitcoin as BTC. Thus, when applying the normalization function to the asset identifier for the first asset exchange with respect to Bitcoin, the asset identifier and the standard representation for Bitcoin in the system are the same. In contrast, when applying the normalization function to the asset identifier for the second asset exchange with respect to Bitcoin, the asset identifier of the second asset exchange and the standard representation for Bitcoin in the system are different. In this case, the output of the normalization function will change XBT to BTC and cause any associated data received from the second asset exchange with respect to XBT (e.g., trade values associated with Bitcoin) to instead be with respect to BTC when being stored and/or involved in processes by the system.

In some examples, the system may apply a partition pattern to the asset data and parse the asset data into one or more data buckets based at least in part on the partition pattern, wherein each data bucket of the one or more data buckets is associated with a respective standard representation. For example, a parser component may identify a particular asset type (e.g., Bitcoin, USD, ETH, etc.) with which the asset data corresponds and store the asset data into a data bucket assigned and/or otherwise associated with that asset type. In some cases, the asset data may include exchange values for that particular asset type with respect to other asset types at a particular exchange. For example, the asset data received for Bitcoin from the various asset exchanges may be stored in a data bucket dedicated to all asset data corresponding to Bitcoin. This may include the exchange rate between Bitcoin and each other available asset provided by each asset exchange. In some cases, each data bucket may correspond to individual exchanges such that when asset data is received from a particular exchange (e.g., exchange rates for each asset available at the exchange), the received asset data is stored in a data bucket dedicated to the exchange from which the asset data was received. In this way, the system may receive, normalize, and store all of the asset data available from the various asset exchanges and provide the asset data in real time to the various users (e.g., traders) inquiring about the asset data and/or attempting to execute a transaction.

In some cases, the asset data may include one or more files. As the files are received, the system may identify a file type and/or an asset type based at least in part on the content located within the file or metadata associated with the file and/or asset data and may determine a parser pattern used to parse the file based at least in part on the file type and/or asset type. By way of example, each parser may be associated with a regular expression (regex) and the system may perform a regex search on each file that is received. When a sequence of characters or a pattern is identified within the file that matches the regex associated with a particular parser, then that parser is determined to be used for parsing the file. The parsers may have been previously generated by the system and associated with specific file types and/or regex such that when a file is received by the system, the system automatically identifies a parser to be used for parsing the information in the file.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example environment 100 for normalizing and parsing data. The environment may include, for example, a client device 102, exchange platform system 104, an asset exchange 106, and/or an over the counter (OTC) market 110. Each of these components may be configured to communicate with each other, such as via a network 112.

The client devices 102 may include components such as, for example, one or more processors 114, one or more network interfaces 116, and/or memory 118. The memory 118 may include components such as, for example, one or more applications 120. As shown in FIG. 1, the client devices 102 may include, for example, a computing device, a mobile phone, a tablet, a laptop, and/or one or more servers. The components of the client device 102 will be described below by way of example. It should be understood that the example provided herein is illustrative, and should not be considered the exclusive example of the components of the client device 102. In examples, the applications 120 of the client device 102 may be configured to display user interfaces, such as secure user interfaces, and to receive user input. The user input may be associated with requests for financial transactions and/or may be in response to data sent from one or more of the systems described herein.

The asset exchange 106 may include one or more components such as, for example, one or more order book databases 122. Likewise, the OTC market 110 may include one or more components such as, for example, one or more order book databases 126. The order book databases 122 and/or the order book databases 126 may include electronic documentation of an asset's buy and sell activity on the asset exchange, such as a cryptocurrency exchange. In some cases, the order book stores record data of buy and sell orders, which can in turn provide the system with particular exchange rates used by the asset exchange for particular assets.

The exchange platform system 104 (referred to as the "system" 104 in some cases) may include one or more components such as, for example, one or more processors 128, one or more network interfaces 130, and/or memory 132. The memory 132 may include one or more components such as, for example, one or more user interfaces 134, a communications component 136, a data storage 138, a parser component 140, a normalization component 142, a monitoring component 144, and/or one or more machine learning models 146. These components of the exchange platform system 104 will be described in detail below.

By way of example, the communications component 136 of the system 104 (e.g., an exchange platform) may be configured to generate connections with the asset exchange 106 and the OTC market 110. The communications component 136 may establish a number of individual communication connections (also referred to as "connections") with multiple asset exchanges and OTC markets offering executable trades for varying types of assets. These connections may enable communication between the asset exchanges and the OTC markets and the system 104 via a high speed and low latency network, such as the network 112.

In some examples, the communications component 136 may be configured to access the order book databases 122 and the order book databases 126 associated with the asset exchange 106 and the OTC market 110, respectively. For example, each of the exchanges (e.g., the asset exchange 106 and the OTC market 110) with which the system 104 is in communication via the connections may store and manage a respective order book. Each of the order books (e.g., the order book databases 122 and the order book databases 126) may include electronic documentation of an asset's buy and sell activity on the exchange. In some cases, the order book stores record data of buy and sell orders, which can in turn provide the system 104 with particular exchange rates used by the exchanges for particular asset types.

In some cases, the system 104 may obtain asset data from each of the respective order book databases 122 and the order book databases 126. The asset data may include a number of asset identifiers associated with a number of asset types and a number of values associated with each of the asset types. For example, each order book (e.g., the order book databases 122 and the order book databases 126) may include a list of the currently open buy and sell orders for an asset. Each exchange may use different asset identifiers to identify a particular asset type. For example, a first asset exchange may identify Bitcoin as "BTC" while a second asset exchange identifies Bitcoin as "XBT." Similarly, a third asset exchange may identify Dogecoin as "DOGE" while another asset exchange may identify Dogecoin as "XDG." These varying identities used to identify the same asset type may be received by the system and stored to be normalized, as discussed in the steps below. In some cases, the values listed in the order book (e.g., the order book databases 122 and the order book databases 126) may indicate what the current exchange rate is for each asset type listed in the order book. For example, the order book may list a value of 1 Bitcoin in exchange for $25,0000 USD. In another example, the order book may list a value of 1 Ethereum in exchange for 0.075 Bitcoin. The order books stored by the exchanges (e.g., the asset exchange 106 and/or the OTC market 110) may list any combination of assets and their associated exchange rates. This asset data (e.g., a number of asset identifiers associated with a number of asset types and a number of values associated with each of the asset types) may be stored by the data storage 138 of the system 104.

Other examples of assets, including digital math-based assets, include those provided above by way of example, and/or the assets may include tokens as described above.

The normalization component 142 of the system 104 may be configured to apply a normalization function to the asset identifiers and generate, based at least in part on applying the normalization function to the asset identifiers, standard representations associated with the assets based on the asset types. For example, the standard representations may represent an asset identifier used by the system 104 for a particular asset type, regardless of what asset identifier is being used in the order books of the various asset exchanges (e.g., the asset exchange 106 and/or the OTC market 110) for that particular asset type. In some cases, the normalization component 142 may utilize the normalization function and receive the asset identifier from the asset exchange 106 and/or the OTC market 110 as an input, apply the normalization function to the asset identifier, and output the standard representation of the asset type with which the asset identifier corresponds to. In some cases, the asset identifier used by the asset exchange 106 and/or the OTC market 110 for the particular asset type may be the same as the standard representation used by the system 104 for representing that asset type. For example, the asset exchange 106 may identify Bitcoin as "BTC" while the OTC market 110 identifies Bitcoin as "XBT." The system 104, when performing operations and/or providing access to one or more users via the client device 102, may have a standard representation of Bitcoin as BTC. Thus, when applying the normalization function to the asset identifier for the asset exchange 106 with respect to Bitcoin, the asset identifier and the standard representation for Bitcoin in the system 104 are the same. In contrast, when applying the normalization function to the asset identifier for the OTC market 110 with respect to Bitcoin, the asset identifier of the OTC market 110 and the standard representation for Bitcoin in the system 104 are different. In this case, the output of the normalization function will change XBT to BTC and cause any associated data received from the OTC market 110 with respect to XBT (e.g., trade values associated with Bitcoin) to instead be with respect to BTC when being stored and/or involved in processes by the system 104.

The parser component 140 may be configured to apply a partition pattern to the asset data and parse the asset data into one or more data buckets based at least in part on the partition pattern. In some cases, each data bucket may be stored via the data storage 138 and associated with a respective standard representation of a particular asset type. For example, the parser component 140 may identify a particular asset type (e.g., Bitcoin, USD, ETH, etc.) with which the asset data corresponds and store the asset data into a data bucket assigned and/or otherwise associated with that asset type. In some cases, the asset data may include exchange values for that particular asset type with respect to other asset types at a particular exchange, such as the asset exchange 106 and/or the OTC market 110. For example, the asset data received for Bitcoin from the various asset exchanges may be stored in a data bucket dedicated to all asset data corresponding to Bitcoin. This may include the exchange rate between Bitcoin and each other available asset provided by each exchange. In some cases, each data bucket may correspond to individual exchanges such that when asset data is received from a particular exchange (e.g., exchange rates for each asset available at the exchange), the received asset data is stored in a data bucket dedicated to the exchange from which the asset data was received. In this way, the system 104 may receive, normalize, and store all of the asset data available from the various exchanges and provide the asset data in real time to the various users (e.g., traders) inquiring about the asset data and/or attempting to execute a transaction.

In some cases, the asset data may include one or more files and as the files are received, the system 104 may identify a file type and/or an asset type based at least in part on the content located within the file or metadata associated with the file and/or asset data and may determine a parser pattern used to parse the file based at least in part on the file type and/or asset type. By way of example, each parser may be associated with a regular expression (regex) and the system may perform a regex search on each file that is received. When a sequence of characters or a pattern is identified within the file that matches the regex associated with a particular parser, then that parser is determined to be used for parsing the file. The parsers may have been previously generated by the system and associated with specific file types and/or regex such that when a file is received by the system, the system automatically identifies a parser to be used for parsing the information in the file.

In some cases, the monitoring component 144 of the system 104 may monitor a status of these connections to determine if a connection has failed and/or otherwise is operating below a threshold performance rate (e.g., operating with throughput that is below a threshold). In some cases, the monitoring component 144 may be configured to monitor data received from the client device 102, the asset exchange 106 and/or the OTC market 110, as well as the connections to the client device 102, the asset exchange 106 and/or the OTC market 110. For example, the data (e.g., files) received from client device 102, the asset exchange 106 and/or the OTC market 110 may include values to be used by the data storage 138, the parser component 140 and/or to be normalized via the normalization component 142. If one of these values contains an error and/or contains a corrupt unit of data, the end-result of the desired outcome may be compromised. The monitoring component 144 may be configured analyze values and/or data structures within the files received from client device 102, the asset exchange 106 and/or the OTC market 110. For example, the monitoring component 144 may be configured to analyze column numbers and row numbers within a file received from client device 102, the asset exchange 106 and/or the OTC market 110 and determine if a row or column is missing or has been added. In some instances, the monitoring component 144 may be configured to determine if a value located within a file received from the client device 102, the asset exchange 106 and/or the OTC market 110 is above a predetermined threshold or below a predetermined threshold. The monitoring component 144 may compare the row number, column number, and/or the values of the files received from the client device 102, the asset exchange 106 and/or the OTC market 110 to previously received files containing the same or similar types of information. In some cases, an error may include determining that at least one input is not defined. If the monitoring component 144 determines that there is an error contained in the files, then the monitoring component 144 may send a notification to a user associated with the system 104 (e.g., a data scientist, engineer, etc.) indicating that an error is present. The notification may also indicate identifying information related to the file, such as a source identifier, file identifier, a location in the file, and/or a type of error. In some examples, the monitoring component 144 may automatically reverse a normalization action to a previous state in response to detecting an error. This may prevent propagation of the error into later processes.

When applying the normalization function, applying the partition patterns, parsing the asset data, and/or determining one or more of the thresholds, values, and/or recommendations described herein, one or more machine learning techniques may be utilized to perform those operations and determine those thresholds, values, and/or recommendations. For example, depending on the value to be determined, a machine learning model 146 may be generated that is configured to determine the value at issue. For example, the machine learning model 146 may be configured to intake, as input, data the machine learning model 146 is configured to utilize and to perform one or more operations to determine the value. Additionally, a training dataset may be generated and utilized to train the machine learning model 146 such that a trained machine learning model 146 is generated. The trained machine learning model 146 may be utilized to determine the values described herein. Just by way of example, training of the machine learning models 146 may result in determining which exchange is offering an optimal exchange rate for a particular set of assets as well as determining confidence degrees and thresholds, exchange rating factors, etc.

Predictive analytic techniques may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases, and may be utilized to predict trends and behavior patterns. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models.

As shown in FIG. 1, several of the components of the exchange platform system 104 and/or the other systems and devices, and the associated functionality of those components as described herein, may be performed by one or more of the other systems and/or by the client devices 102. Additionally, or alternatively, some or all of the components and/or functionalities associated with the client devices 102 may be performed by the exchange platform system 104.

As used herein, a processor, such as processor(s) 114 and/or 128, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 114 and/or 128 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 114 and/or 128 may possess its own local memory, which also may store program components, program data, and/or one or more operating systems.

The memory 118 and/or 132 may include volatile and nonvolatile memory, removable and non-removable media implemented in any method or technology for storage of information, such as computer-readable instructions, data structures, program component, or other data. Such memory 118 and/or 132 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 118 and/or 132 may be implemented as computer-readable storage media ("CRSM"), which may be any available physical media accessible by the processor(s) 114 and/or 128 to execute instructions stored on the memory 118 and/or 132. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 118 and/or 132, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 116 and/or 130 may enable messages between the components and/or devices shown in the environment 100 and/or with one or more other remote systems, as well as other networked devices. Such network interface(s) 116 and/or 130 may include one or more network interface controllers (NICs) or other types of transceiver devices to send and receive messages over the network 112.

For instance, each of the network interface(s) 116 and/or 130 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 116 and/or 130 may include a wide area network (WAN) component to enable message over a wide area network. In some examples, the network interfaces may be usable to generate a user interface, such as user interface 148, presentable via the electronic device 102. In this case, the user interface 148 shows a portfolio breakdown window. Although, a number of other types of windows may be presented via the user interface 148, such as a market overview window, a correlation matrix window, a portfolio positions window, etc. Each of the windows included in the interface 148 may include asset data obtained by the system 104 and stored in the data storage 138 or one or more data bucket(s).

In some instances, the exchange platform system 104 may be local to an environment associated the electronic device 102. For instance, the exchange platform system 104 may be located within the electronic device 102. In some instances, some or all of the functionality of the exchange platform system 104 may be performed by the electronic device 102. Also, while various components of the exchange platform system 104 have been labeled and named in this disclosure and each component has been described as being configured to cause the processor(s) to perform certain operations, it should be understood that the described operations may be performed by some or all of the components and/or other components not specifically illustrated.

Figure 2:
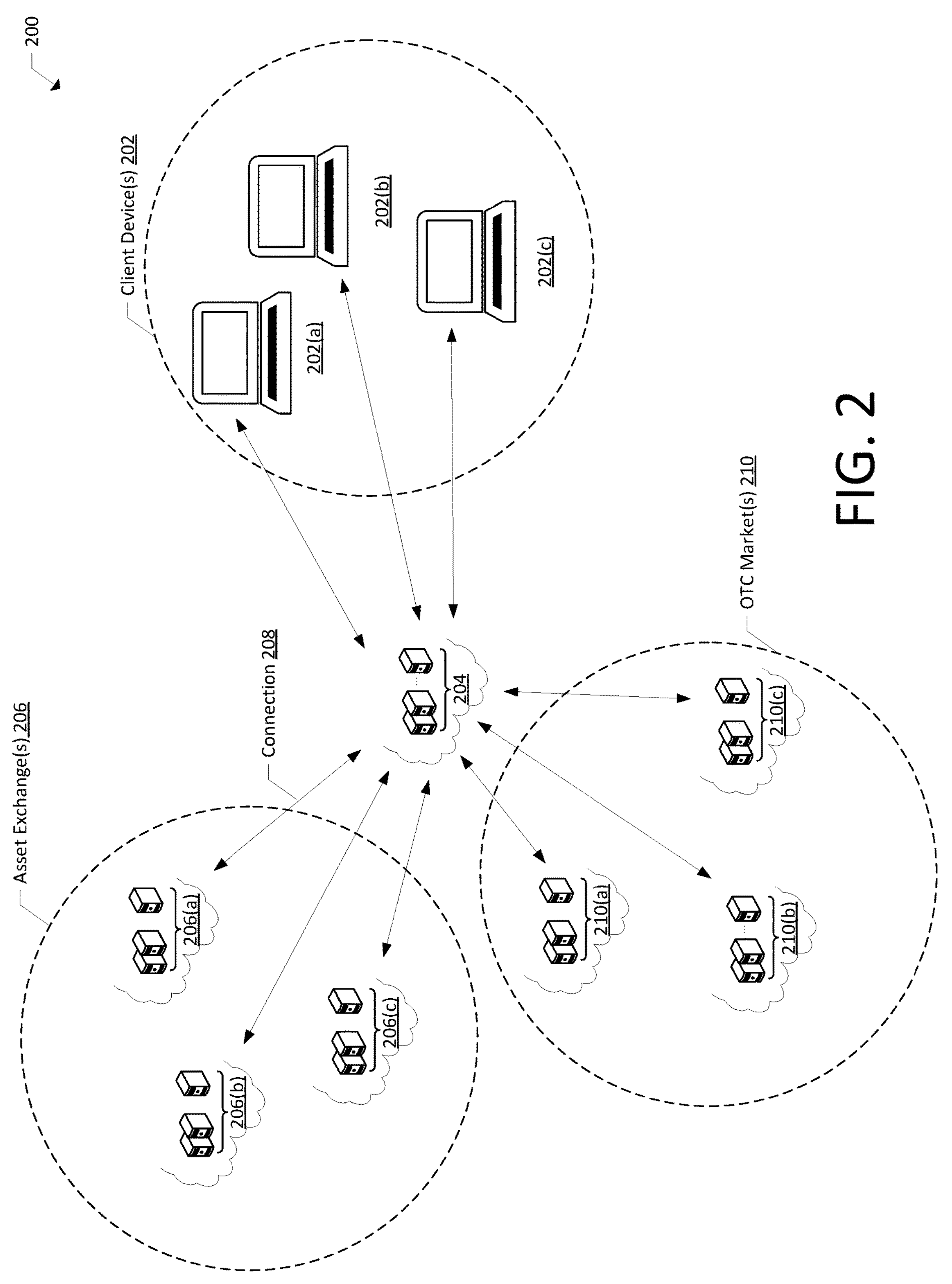
FIG. 2 illustrates a schematic diagram of an example environment for generating and maintaining one or more connections.

FIG. 2 illustrates a schematic diagram of an example environment 200 for normalizing and parsing data from one or more exchanges via one or more connections. The environment 200 may include, for example, multiple client devices 202, including client devices 202 (*a*), 202 (*b*), and 202 (*c*), (each of which may be the same or similar to the client device 102), an exchange platform system 204 (which may be the same or similar to the exchange platform system 104), multiple asset exchanges 206, including asset exchanges 206 (*a*), 206 (*b*), and 206 (*c*), (each of which may be the same or similar to the asset exchange 106), and/or multiple OTC markets 210, including OTC markets 210 (*a*), 210 (*b*), and 210 (*c*), (each of which may be the same or similar to the OTC market 110). Each of the client devices 202, the asset exchanges 206, and the OTC markets 210 may be configured to communicate with the system 204 via their respective connections, such as a connection 208.

The components of the environment 200 may be utilized to aggregate and normalize market data from multiple types of asset exchanges (e.g., asset exchanges 206 and OTC markets 210), and provide functionality to allow a user (e.g., assets trader) to receive real-time updates to exchange rates between varying types of assets via the client devices 202. For example, the system 204 (e.g., an exchange platform) may generate multiple connections, such as the connection 208, with the asset exchanges 206, the OTC markets 210, and/or the client devices 202. For example, a communications component of the system 204, such as the communications component 136, may establish individual communication connections (also referred to as "connections") with asset exchanges 206 and the OTC markets 210 offering executable trades for varying types of assets and provide asset data received from the asset exchanges 206 and the OTC markets 210 and the client devices 202. These connections (e.g., connection 208) may enable communication between the different types of exchanges (e.g., asset exchanges 206 and the OTC markets 210) and the system 204 via a high speed and low latency network. In some cases, a monitoring component of the system 204, such as the monitoring component 144, may monitor a status of these connections to determine if a connection has failed and/or otherwise is operating below a threshold performance rate (e.g., operating with throughput that is below a threshold).

In some examples, the system 204 may access respective order books of each of the asset exchanges 206 and the OTC markets 210 via the respective connections. For example, each of the asset exchanges 206 and the OTC markets 210 with which the system 204 is in communication via the connections may store and manage a respective order book. Each of the order books may include electronic documentation of an asset's buy and sell activity on the asset exchanges 206 and the OTC markets 210. In some cases, the order book stores record data of buy and sell orders, which can in turn provide the system 204 with particular exchange rates used by the asset exchanges 206 and the OTC markets 210 for particular assets. In this way, the system 204 enables users to have access to exchange rate data and/or to execute trades with exchanges (e.g., asset exchanges 206 and the OTC markets 210) that would not typically be accessible via a single platform accessible by the client devices 202.

Although three asset exchanges are illustrated for asset exchanges 206, three OTC markets are illustrated for 210, and three client devices are illustrated for client devices 202, it is understood that any number of these exchanges and client devices may exist in an environment, such as the environments 100, 200, and 300 (described below). By way of example, in some scenarios, there may be approximately 9,000 client devices receiving normalized and parsed asset data from the system 204. The system 204 may be receiving the asset data from approximately 30 exchanges, which may include a combination of asset exchanges and OTC markets. In some examples, each of the exchanges may include approximately 50,000 different price values (e.g., exchange rates) in their respective order books and the system 204 may receive approximately 500,000 price value updates per second. By maintaining the connections with the exchanges in a high speed and low latency network, the system 204 ensures that all the necessary asset data is received, normalized, parsed, and presented on the user interface of the client devices in near real time.

Figure 3:
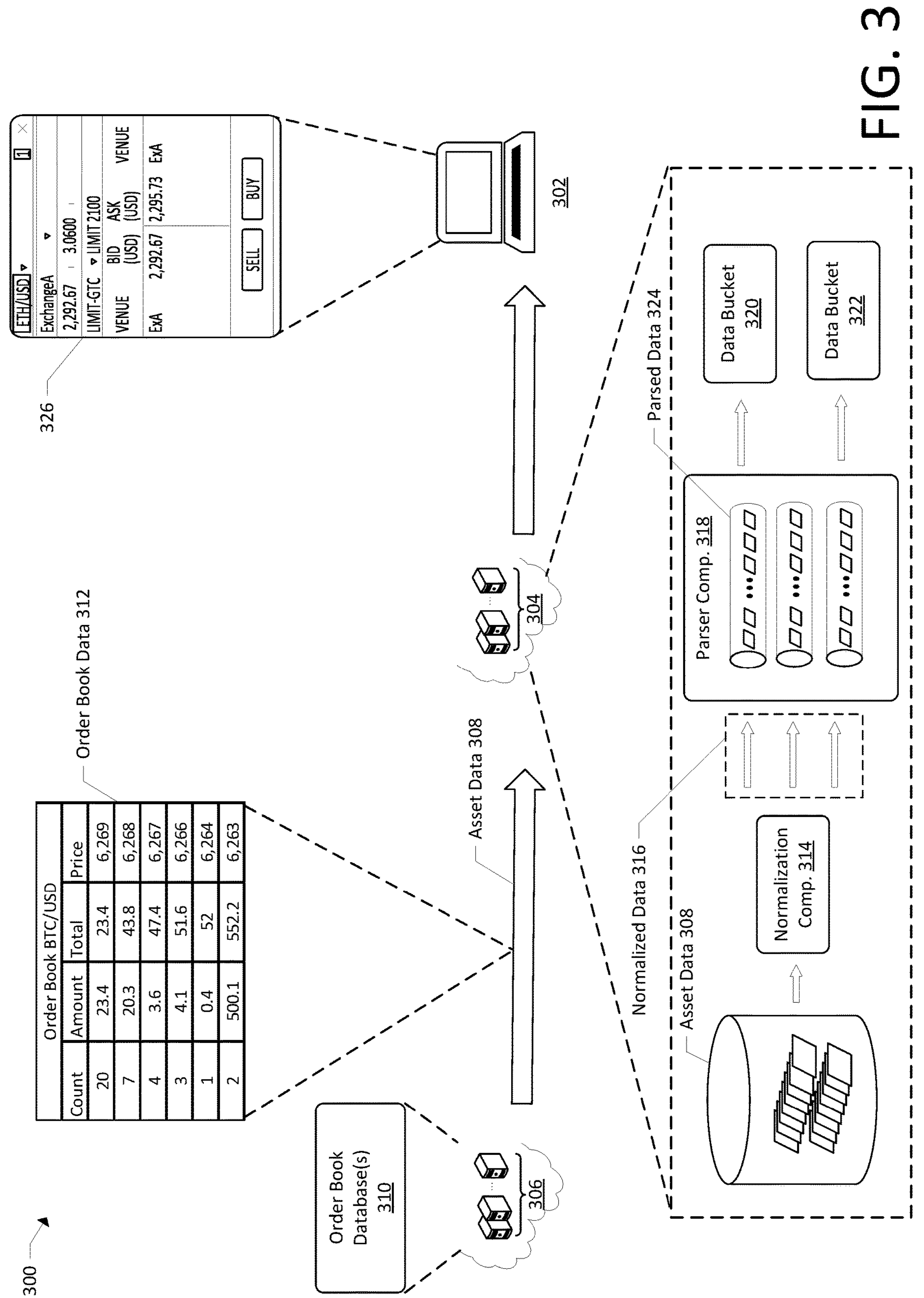
FIG. 3 illustrates a schematic diagram of an example environment for normalizing and parsing data.

FIG. 3 illustrates a schematic diagram of an example environment 300 for normalizing and parsing asset data from one or more exchanges via one or more connections. The environment 300 may include, for example, a client device 302, (which may be the same or similar to the client device 102), an exchange platform system 304 (which may be the same or similar to the exchange platform system 104), and exchange 306, including asset exchanges 206 (*a*), 206 (*b*), 206 (which may be the same or similar to the asset exchange 106 and/or the OTC market 110). Each of the client device 302 and the exchange 306 may be configured to communicate with the system 304 via their respective connections and/or via a network.

As illustrated in FIG. 3, the system 304 may receive asset data 308 from the exchange 306. The asset data 308 may include data obtained from an order book database 310 and include an electronic documentation of an asset's buy and sell activity on the exchange 306. In some cases, the order book database 310 stores record data of buy and sell orders, which can in turn provide the system 304 with particular exchange rates used by the exchange 306 for particular assets. For example, order book data 312 may be included in the asset data 308 and provide information pertaining to particular asset types, such as an asset type bid, asset type ask, asset type amount, and asset type price. This information is often presented via two sides of an order book known as the buy-side and sell-side. The illustrated example of FIG. 3 shows order book data 312 of a buy-side of an order book for BTC/USD transactions. Although the order book data 312 references buy-side data between BTC and USD, it is understood that any asset made available to be involved in a transaction by the exchange 306 may include respective asset data that may be obtained by the exchange 304. As illustrated by the order book data 312, the amount and price per order display the total units of the asset looking to be traded and at what price each unit is valued. The count refers to how many orders are combined at this price level to create the amount, whereas the total is simply a running total of the combined amounts. In some cases, the asset data 308 may be received via one or more bundles to reduce the number of transmissions needed to update the asset data, and thus, may reduce stress on the network and improve performance of the network. For example, the system 304 may receive 500,000 price value updates via 50,000 bundles, with 10 price updates located within each bundle.

In some cases, once the asset data 308 is received, the system 304 may perform an initial parsing operation on the asset data 308 to organize the asset data 308 based on asset type, asset identifiers, exchange identifiers, OTC market identifiers, and/or the like. For example, different exchanges and/or OTC markets may provide asset data (e.g., such as asset data 308) that refers to the same asset type with different asset identifiers based on which exchange and/or OTC market the asset data was received from. In this case, the system 304 may initially group the asset data associated with a particular asset type together, prior to applying a normalization function to the asset data, regardless of the asset identifier associated with the asset type used by the exchange and/or OTC market. In this way, the system 304 may more efficiently apply the normalization function to a larger portion of asset data within an asset type group, as opposed to individual portions of asset data.

Once the asset data 308 is received, a normalization component 314 (which may be the same or similar to the normalization component 142) of the system 304 may be configured to apply a normalization function to the asset identifiers included in the asset data and generate, based at least in part on applying the normalization function to the asset identifiers, normalized data 316, which may also be referred to as standard representations associated with the assets based on the asset types. For example, the standard representations may represent an asset identifier used by the system 304 for a particular asset type, regardless of what asset identifier is being used in the order books of the various asset exchanges (e.g., the asset exchange 106 and/or the OTC market 110) for that particular asset type. In some cases, the normalization component 314 may utilize the normalization function and receive the asset identifier from the exchange 306 as an input, apply the normalization function to the asset identifier, and output the normalized data 316 (e.g., standard representation) of the asset type with which the asset identifier corresponds to. In some cases, the asset identifier used by the exchange 306 for the particular asset type may be the same as the standard representation used by the system 304 for representing that asset type.

The parser component 318, which may be the same as the parser component 140, may be configured to apply a partition pattern to the normalized data 316 and parse the asset data into one or more data buckets, such as the data bucket 320 and the data bucket 322, based at least in part on the partition pattern. In some cases, each data bucket may be stored via the data storage 138 and associated with a respective standard representation of a particular asset type. For example, the parser component 318 may identify a particular asset type (e.g., Bitcoin, USD, ETH, etc.) with which the normalized data 316 corresponds and generate parsed data 324 to be stored by the corresponding data bucket (e.g., data bucket 320 and/or data bucket 322) assigned and/or otherwise associated with that asset type. In some cases, the normalized data 316 may include exchange values for that particular asset type with respect to other asset types at the particular exchange 306, (e.g., asset exchange 106 and/or the OTC market 110). For example, the asset data received for Bitcoin from the various asset exchanges may be stored in a data bucket 320 dedicated to all asset data corresponding to Bitcoin. This may include the exchange rate between Bitcoin and each other available asset provided by each exchange. In some cases, each data bucket may correspond to individual exchanges such that when asset data is received from a particular exchange (e.g., exchange rates for each asset available at the exchange), the received asset data is stored in a data bucket dedicated to the exchange from which the asset data was received. For example, data bucket 322 may be assigned to exchange 306 and store all asset data received from exchange 306. In this way, the system 304 may receive, normalize, parse, and store all of the asset data available from the various exchanges and provide the asset data in real time to the various users (e.g., traders) inquiring about the asset data and/or attempting to execute a transaction via the client device 302 and/or corresponding user interface 326.

Figure 4:
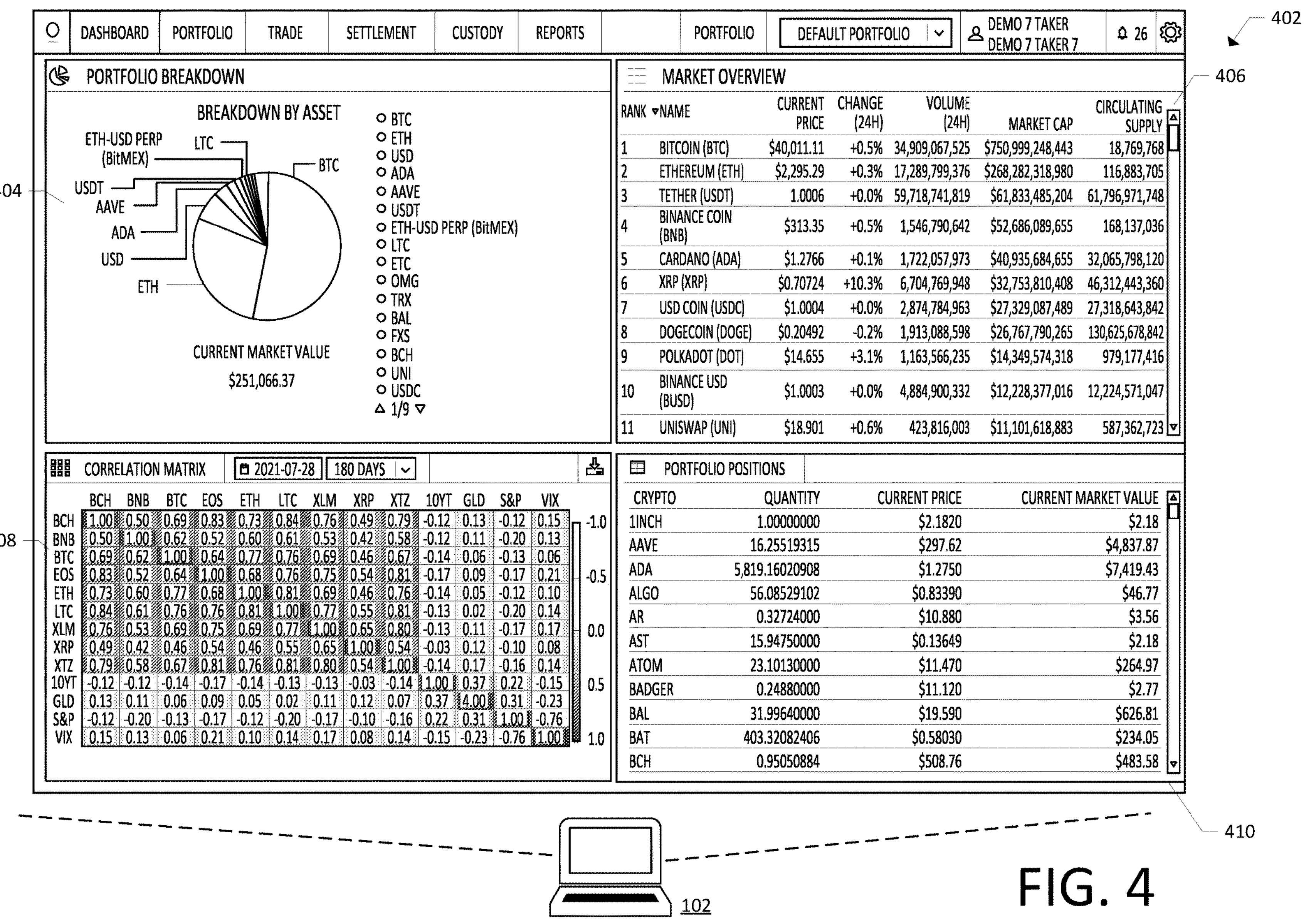
FIG. 4 illustrates an example user interface for accessing an exchange platform.

FIG. 4 illustrates an example interface 402 that may be presented to a user via the client device 102, client device 202, and/or client device 302, to provide functionality to allow the user to access and execute trades involving asset data obtained from one or more exchanges, such as the asset exchange 106, asset exchanges 206, OTC markets 110, OTC markets 210, and/or the exchange 306. The interface 402 may include a number of windows, such as a portfolio breakdown window 404, a market overview window 406, a correlation matrix window 408, and/or a portfolio positions window 410. Each of the windows included in the interface 402 may include asset data obtained by the system 104 and stored in the data storage 138, the data bucket 320, the data bucket 322, and/or one or more other data buckets stored by the system 104 and/or otherwise accessible by the system 104. For example, the system 104 may configure the asset data received from the exchanges (e.g., asset exchange 106 and/or OTC market 110) to be presented on a number of user interfaces once it has been normalized and parsed. The system 104 may cause the asset data presented in the windows to be updated in real time as the values associated with each asset change on the order books of the exchanges. For example, by maintaining the connections with the exchanges in a high speed and low latency network, the system 104 ensures that all the asset data is received, normalized, parsed, and presented on the user interface of the client device 102.

Figure 5:
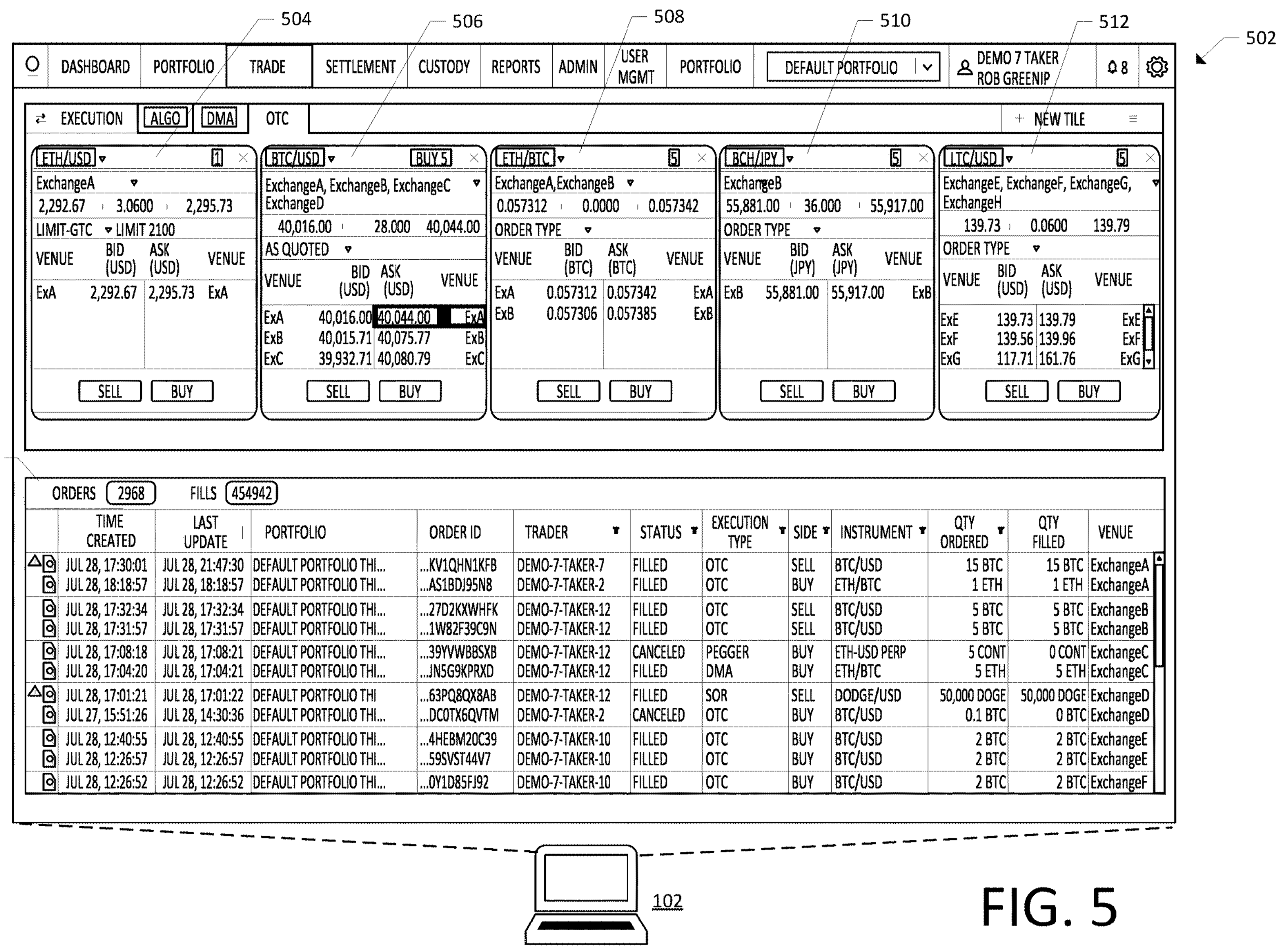
FIG. 5 illustrates another example user interface for accessing an exchange platform.

FIG. 5 illustrates an example interface 502 that may be presented to a user via the client device 102, client device 202, and/or client device 302, to provide functionality to allow the user to access and execute trades involving asset data obtained from one or more exchanges, such as the asset exchange 106, asset exchanges 206, OTC market 110, OTC markets 210, and/or the exchange 306. The interface 502 may include a number of tiles, such as tile 504, tile 506, tile 508, tile 510, and/or tile 512. Each of tile 504, tile 506, tile 508, tile 510, and/or tile 512 included in the interface 502 may include asset data obtained by the system 104 and stored in the data storage 138, the data bucket 320, the data bucket 322, and/or one or more other data buckets stored by the system 104 and/or otherwise accessible by the system 104. For example, the system 104 may configure the asset data received from the exchanges (e.g., asset exchange 106 and/or OTC market 110) to be presented on a number of user interfaces once it has been normalized and parsed. The system 104 may cause the asset data presented in tile 504, tile 506, tile 508, tile 510, and/or tile 512 to be updated in real time as the values associated with each asset change on the order books of the exchanges. For example, the tiles may represent a pending trade to be executed by a user (e.g., a trader). Each tile may include an indication of which assets are being traded (e.g., ETH/USD, BTC/USD, ETH/BTC, BCH/JPY, and/or LTC/USD) for that particular trade as well as which exchanges the system 104 is obtaining asset data from to determine and present the exchange rate. For example, each tile may enable a user to select which exchanges (sometimes referred to as "venues") they desire to participate in a transaction with. In some cases, the user may select for multiple exchanges and/or all of the exchanges accessible by the system 104 to be considered in determining the exchange rate for the desired trade and the system 104 may determine which exchange rate provides a most optimal rate for the user and present the optimal exchange rate on the tile.

In some examples, each tile may include a selectable option to "sell" or "buy," which, in turn, executes the desired trade. By maintaining the connections with the exchanges in a high speed and low latency network, the system 104 ensures that the exchange rate for each trade is accurate and is, in fact, the best deal for the user executing the trade. In this way, the system 104 prevents lagging updates to exchange rates and/or failures to update exchange rates in real time, which prevents potential slippage experienced by the trader. That is, the trader may not experience a substantial difference between the expected price (e.g., exchange rate) of an order and the price (e.g., exchange rate) when the order actually executes.

Figure 6:
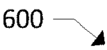
FIG. 6 illustrates a flow diagram of an example process for normalizing and parsing data.
Figure 6:
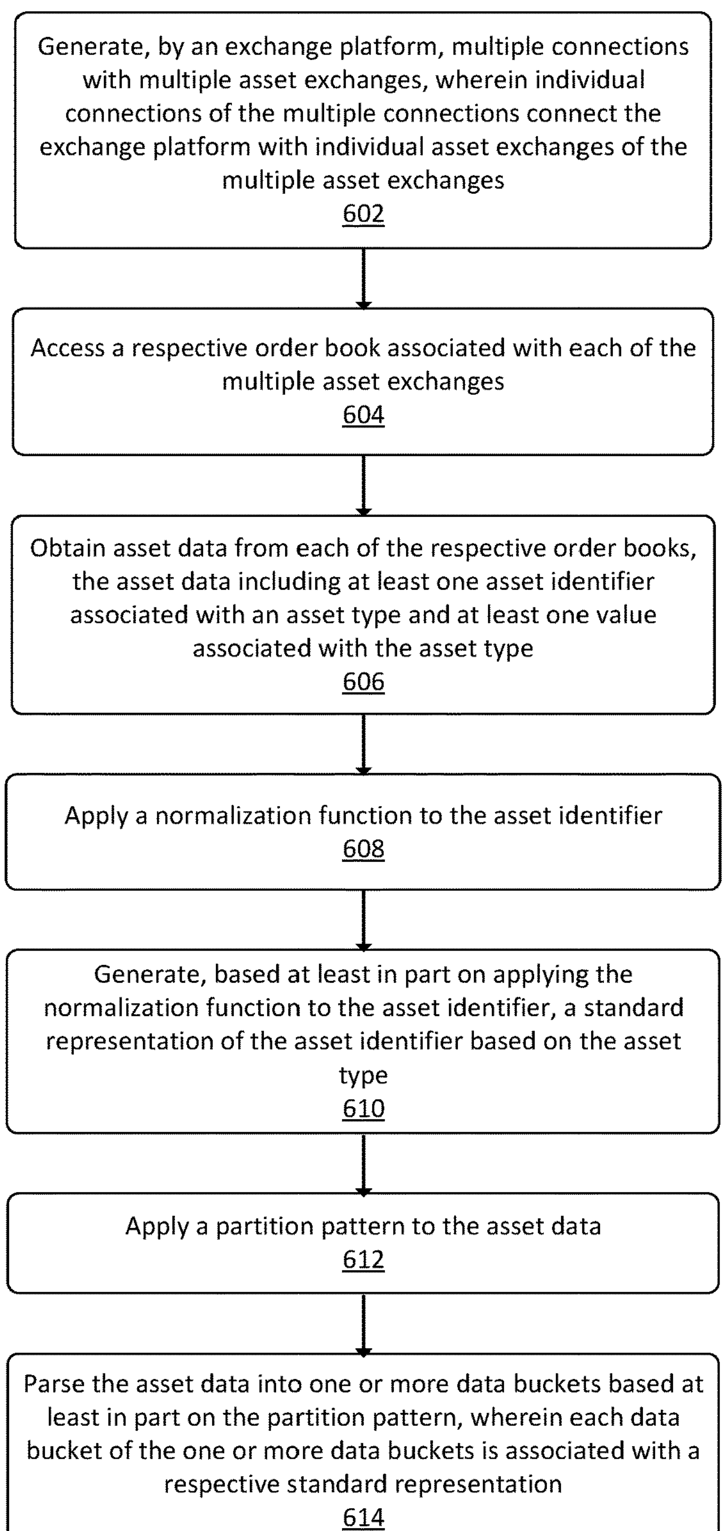
Figure 7:
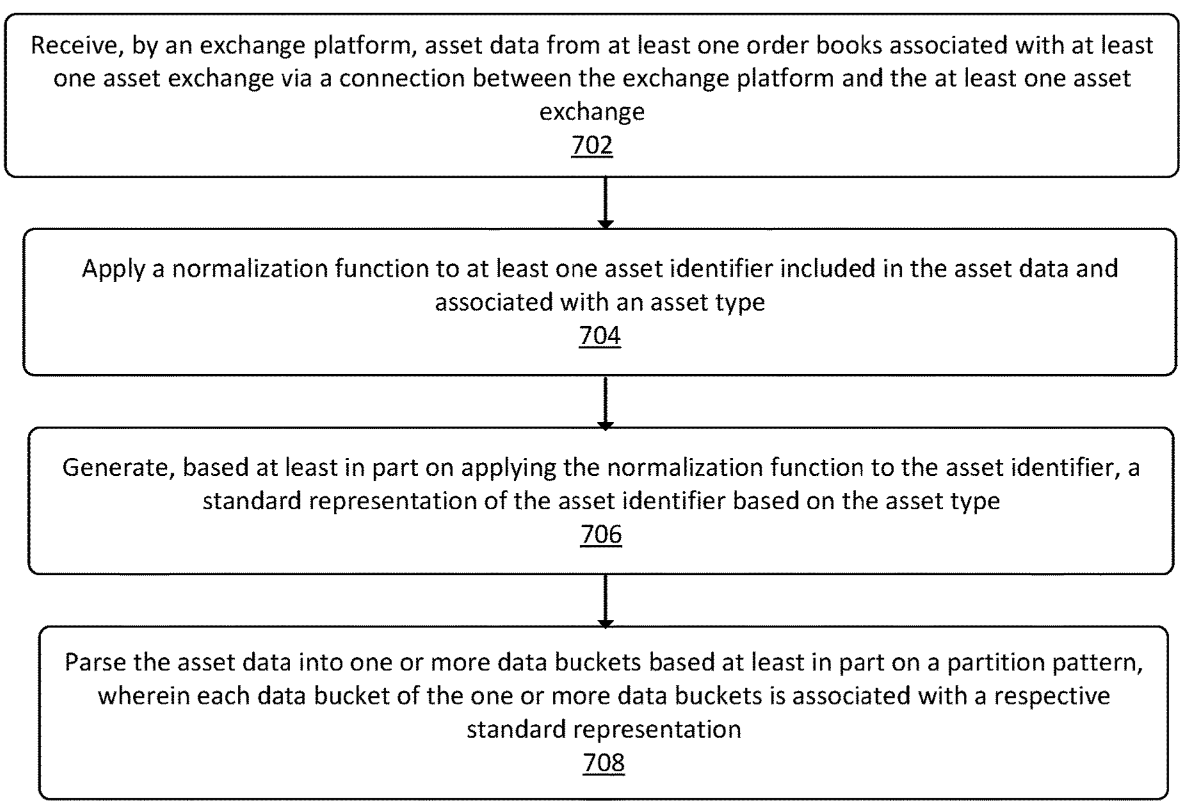
FIG. 7 illustrates a flow diagram of another example process for normalizing and parsing data.
Figure 8:
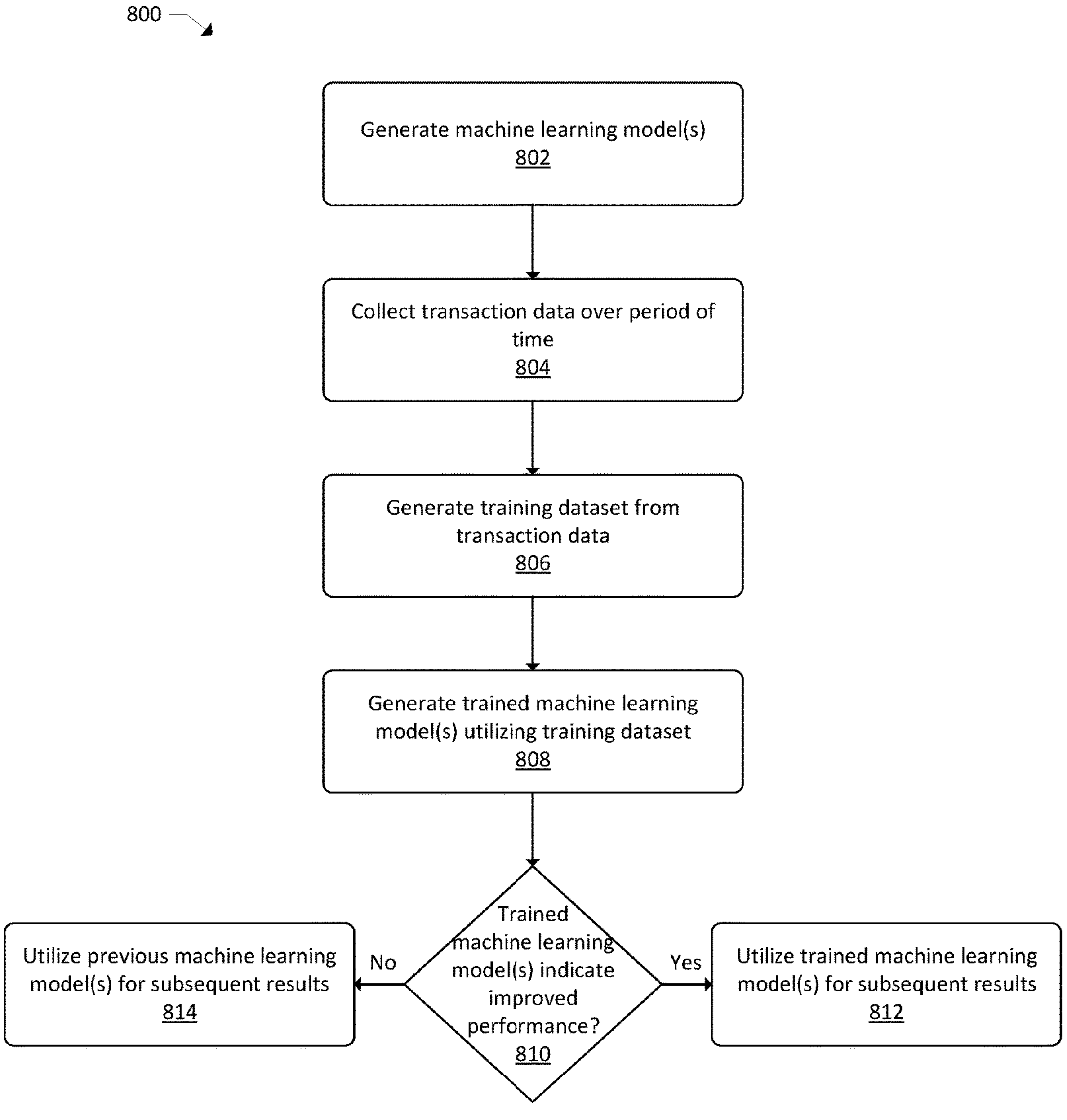
FIG. 8 illustrates a flow diagram of an example process for training and utilizing one or more machine learning models to perform operations as described herein.

FIGS. 6-8 illustrate various processes for normalizing and parsing data. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-5, although the processes may be implemented in a wide variety of other environments, architectures and systems.

FIG. 6 illustrates a flow diagram of an example process 600 for normalizing and parsing asset data received from one or more asset exchanges. The order in which the operations or steps are described is not intended to be construed as a limitation, and any number of the described operations may be combined in any order and/or in parallel to implement process 600.

At block 602, the process 600 may include generating, by an exchange platform, multiple connections with multiple asset exchanges, wherein individual connections of the multiple connections connect the exchange platform with individual asset exchanges of the multiple asset exchanges. For example, the communications component 136 of the system 104 (e.g., an exchange platform) may be configured to generate connections with the asset exchange 106 and the OTC market 110. The communications component 136 may establish a number of individual communication connections (also referred to as "connections") with multiple asset exchanges and OTC markets offering executable trades for varying types of assets. These connections may enable communication between the asset exchanges and the OTC markets and the system 104 via a high speed and low latency network, such as the network 112.

At block 604, the process 600 may include accessing a respective order book associated with each of the multiple asset exchanges. For example, the communications component 136 may be configured to access the order book databases 122 and the order book databases 126 associated with the asset exchange 106 and the OTC market 110. For example, each of the exchanges (e.g., the asset exchange 106 and the OTC market 110) with which the system 104 is in communication via the connections may store and manage a respective order book. Each of the order books (e.g., the order book databases 122 and the order book databases 126) may include electronic documentation of buy and sell activity associated with asset(s) on the exchange. In some cases, the order book stores record data of buy and sell orders, which can in turn provide the system 104 with particular exchange rates used by the exchanges for particular asset types.

At block 606, the process 600 may include obtaining asset data from each of the respective order books, the asset data including at least one asset identifier associated with an asset type and at least one value associated with the asset type. For example, the asset data may include a number of asset identifiers associated with a number of asset types and a number of values associated with each of the asset types. For example, each order book (e.g., the order book databases 122 and the order book databases 126) may include a list of the currently open buy and sell orders for an asset. Each exchange may use different asset identifiers to identify a particular asset type. For example, a first asset exchange may identify Bitcoin as "BTC" while a second asset exchange identifies Bitcoin as "XBT." Similarly, a third asset exchange may identify Dogecoin as "DOGE" while another asset exchange may identify Dogecoin as "XDG." These varying identities used to identify the same asset type may be received by the system and stored to be normalized, as discussed in the steps below. In some cases, the values listed in the order book (e.g., the order book databases 122 and the order book databases 126) may indicate what the current exchange rate is for each asset type listed in the order book. For example, the order book may list a value of 1 Bitcoin in exchange for $25,0000 USD. In another example, the order book may list a value of 1 Ethereum in exchange for 0.075 Bitcoin. The order books stored by the exchanges (e.g., the asset exchange 106 and/or the OTC market 110) may list any combination of assets and their associated exchange rates. This asset data (e.g., a number of asset identifiers associated with a number of asset types and a number of values associated with each of the asset types) may be stored by the data storage 138 of the system 104.

At block 608, the process 600 may include applying a normalization function to the asset identifier and at block 610, the process 600 may include generating, based at least in part on applying the normalization function to the asset identifier, a standard representation of the asset identifier based on the asset type. For example, a normalization component 142 of the system 104 may be configured to apply a normalization function to the asset identifiers and generate, based at least in part on applying the normalization function to the asset identifiers, standard representations associated with the assets based on the asset types. For example, the standard representations may represent an asset identifier used by the system 104 for a particular asset type, regardless of what asset identifier is being used in the order books of the various asset exchanges (e.g., the asset exchange 106 and/or the OTC market 110) for that particular asset type. In some cases, the normalization component 142 may utilize the normalization function and receive the asset identifier from the asset exchange 106 and/or the OTC market 110 as an input, apply the normalization function to the asset identifier, and output the standard representation of the asset type with which the asset identifier corresponds to. In some cases, the asset identifier used by the asset exchange 106 and/or the OTC market 110 for the particular asset type may be the same as the standard representation used by the system 104 for representing that asset type. For example, the asset exchange 106 may identify Bitcoin as "BTC" while the OTC market 110 identifies Bitcoin as "XBT." The system 104, when performing operations and/or providing access to one or more users via the client device 102, may have a standard representation of Bitcoin as BTC. Thus, when applying the normalization function to the asset identifier for the asset exchange 106 with respect to Bitcoin, the asset identifier and the standard representation for Bitcoin in the system 104 are the same. In contrast, when applying the normalization function to the asset identifier for the OTC market 110 with respect to Bitcoin, the asset identifier of the OTC market 110 and the standard representation for Bitcoin in the system 104 are different. In this case, the output of the normalization function will change XBT to BTC and cause any associated data received from the OTC market 110 with respect to XBT (e.g., trade values associated with Bitcoin) to instead be with respect to BTC when being stored and/or involved in processes by the system 104.

At block 612, the process 600 may include applying a partition pattern to the asset data and at block 614, the process 600 may include parsing the asset data into one or more data buckets based at least in part on the partition pattern, wherein each data bucket of the one or more data buckets is associated with a respective standard representation. For example, a parser component 140 may be configured to apply a partition pattern to the asset data and parse the asset data into one or more data buckets based at least in part on the partition pattern. In some cases, each data bucket may be stored via the data storage 138 and associated with a respective standard representation of a particular asset type. For example, the parser component 140 may identify a particular asset type (e.g., Bitcoin, USD, ETH, etc.) with which the asset data corresponds and store the asset data into a data bucket assigned and/or otherwise associated with that asset type. In some cases, the asset data may include exchange values for that particular asset type with respect to other asset types at a particular exchange, such as the asset exchange 106 and/or the OTC market 110. For example, the asset data received for Bitcoin from the various asset exchanges may be stored in a data bucket dedicated to all asset data corresponding to Bitcoin. This may include the exchange rate between Bitcoin and other available assets provided by each exchange. In some cases, each data bucket may correspond to individual exchanges such that when asset data is received from a particular exchange (e.g., exchange rates for each asset available at the exchange), the received asset data is stored in a data bucket dedicated to the exchange from which the asset data was received. In this way, the system 104 may receive, normalize, and store all of the asset data available from the various exchanges and provide the asset data in real time to the various users (e.g., traders) inquiring about the asset data and/or attempting to execute a transaction.

Additionally and/or alternatively, the process 600 may include causing the asset data to be presented on a user device.

Additionally and/or alternatively, the process 600 may include receiving a transmission indicating an update to at least one order book, determining the update is associated with a value change of at least one asset, and presenting the value change of the at least one asset on a user device.

Additionally and/or alternatively, the process 600 may include the asset data being received via multiple data bundles, each of the multiple data bundles containing multiple values associated with multiple assets.

Additionally and/or alternatively, the process 600 may include determining that at least one file included within at least one of multiple data bundles or multiple values is corrupt.

Additionally and/or alternatively, the process 600 may include determining that at least one connection of the multiple connections has failed and performing, in response to determining that the at least one connection has failed, restoration processes to the at least one connection.

Additionally and/or alternatively, the process 600 may include presenting, via a user device, an option to buy or sell a first asset in exchange for a second asset, receiving, from the user device, an instruction to buy or sell the first asset in exchange for the second asset, sending a transmission to at least one asset exchange of the multiple asset exchanges requesting to buy or sell the first asset in exchange for the second asset, and receiving a response from the at least one asset exchange of the multiple asset exchanges confirming a transaction to buy or sell the first asset in exchange for the second asset.

Additionally and/or alternatively, the process 600 may include receiving, from a user device, a trade request to buy or sell a first asset in exchange for a second asset, receiving, from the user device, selection of at least one asset exchange of the multiple asset exchanges with which to participate in the trade request, determining an exchange rate between the first asset and the second asset provided by the at least one asset exchange, and presenting, via the user device, an option to buy or sell the first asset in exchange for the second asset based at least in part on the exchange rate.

Additionally and/or alternatively, the process 600 may include receiving a transmission indicating an update to at least one order book of the at least one asset exchange, determining the update is associated with the exchange rate offered by the at least one asset exchange, presenting an updated exchange rate on the user device.

Additionally and/or alternatively, the process 600 may include presenting, based at least in part on the asset data and via a user device, at least one of a portfolio breakdown associated with one or more assets, a market overview associated with one or more assets, a correlation matrix associated with one or more assets, or a portfolio position associated with one or more assets.

Additionally and/or alternatively, the process 600 may include receiving a transmission indicating an update to at least one order book of at least one asset exchange, determining the update is associated with at least one of: the portfolio breakdown associated with one or more assets, the market overview associated with one or more assets, the correlation matrix associated with one or more assets, or the portfolio position associated with one or more assets, and presenting the update on the user device.

FIG. 7 illustrates a flow diagram of an example process 700 for normalizing and parsing asset data received from at least one asset exchange. The order in which the operations or steps are described is not intended to be construed as a limitation, and any number of the described operations may be combined in any order and/or in parallel to implement process 700.

At block 702, the process 700 may include receiving, by an exchange platform, asset data from at least one order books associated with at least one asset exchange via a connection between the exchange platform and the at least one asset exchange. For example, the asset data may include a number of asset identifiers associated with a number of asset types and a number of values associated with each of the asset types. For example, each order book (e.g., the order book databases 122 and the order book databases 126) may include a list of the currently open buy and sell orders for an asset. Each exchange may use different asset identifiers to identify a particular asset type. For example, a first asset exchange may identify Bitcoin as "BTC" while a second asset exchange identifies Bitcoin as "XBT." Similarly, a third asset exchange may identify Dogecoin as "DOGE" while another asset exchange may identify Dogecoin as "XDG." These varying identities used to identify the same asset type may be received by the system and stored to be normalized, as discussed in the steps below. In some cases, the values listed in the order book (e.g., the order book databases 122 and the order book databases 126) may indicate what the current exchange rate is for each asset type listed in the order book. For example, the order book may list a value of 1 Bitcoin in exchange for $25,0000 USD. In another example, the order book may list a value of 1 Ethereum in exchange for 0.075 Bitcoin. The order books stored by the exchanges (e.g., the asset exchange 106 and/or the OTC market 110) may list any combination of assets and their associated exchange rates. This asset data (e.g., a number of asset identifiers associated with a number of asset types and a number of values associated with each of the asset types) may be stored by the data storage 138 of the system 104.

At block 704, the process 700 may include applying a normalization function to at least one asset identifier included in the asset data and associated with an asset type and at block 706, the process 700 may include generating, based at least in part on applying the normalization function to the asset identifier, a standard representation of the asset identifier based on the asset type. For example, a normalization component 142 of the system 104 may be configured to apply a normalization function to the asset identifiers and generate, based at least in part on applying the normalization function to the asset identifiers, standard representations associated with the assets based on the asset types. For example, the standard representations may represent an asset identifier used by the system 104 for a particular asset type, regardless of what asset identifier is being used in the order books of the various asset exchanges (e.g., the asset exchange 106 and/or the OTC market 110) for that particular asset type. In some cases, the normalization component 142 may utilize the normalization function and receive the asset identifier from the asset exchange 106 and/or the OTC market 110 as an input, apply the normalization function to the asset identifier, and output the standard representation of the asset type with which the asset identifier corresponds to.

In some cases, the asset identifier used by the asset exchange 106 and/or the OTC market 110 for the particular asset type may be the same as the standard representation used by the system 104 for representing that asset type. For example, the asset exchange 106 may identify Bitcoin as "BTC" while the OTC market 110 identifies Bitcoin as "XBT." The system 104, when performing operations and/or providing access to one or more users via the client device 102, may have a standard representation of Bitcoin as BTC. Thus, when applying the normalization function to the asset identifier for the asset exchange 106 with respect to Bitcoin, the asset identifier and the standard representation for Bitcoin in the system 104 are the same. In contrast, when applying the normalization function to the asset identifier for the OTC market 110 with respect to Bitcoin, the asset identifier of the OTC market 110 and the standard representation for Bitcoin in the system 104 are different. In this case, the output of the normalization function will change XBT to BTC and cause any associated data received from the OTC market 110 with respect to XBT (e.g., trade values associated with Bitcoin) to instead be with respect to BTC when being stored and/or involved in processes by the system 104.

At block 708, the process 700 may include parsing the asset data into one or more data buckets based at least in part on a partition pattern, wherein each data bucket of the one or more data buckets is associated with a respective standard representation. For example, a parser component 140 may be configured to apply a partition pattern to the asset data and parse the asset data into one or more data buckets based at least in part on the partition pattern. In some cases, each data bucket may be stored via the data storage 138 and associated with a respective standard representation of a particular asset type. For example, the parser component 140 may identify a particular asset type (e.g., Bitcoin, USD, ETH, etc.) with which the asset data corresponds and store the asset data into a data bucket assigned and/or otherwise associated with that asset type. In some cases, the asset data may include exchange values for that particular asset type with respect to other asset types at a particular exchange, such as the asset exchange 106 and/or the OTC market 110. For example, the asset data received for Bitcoin from the various asset exchanges may be stored in a data bucket dedicated to all asset data corresponding to Bitcoin. This may include the exchange rate between Bitcoin and each other available asset provided by each exchange. In some cases, each data bucket may correspond to individual exchanges such that when asset data is received from a particular exchange (e.g., exchange rates for each asset available at the exchange), the received asset data is stored in a data bucket dedicated to the exchange from which the asset data was received. In this way, the system 104 may receive, normalize, and store all of the asset data available from the various exchanges and provide the asset data in real time to the various users (e.g., traders) inquiring about the asset data and/or attempting to execute a transaction.

FIG. 8 illustrates a flow diagram of an example process 800 for training and utilizing one or more machine learning models to perform operations as described herein. The order in which the operations or steps are described is not intended to be construed as a limitation, and any number of the described operations may be combined in any order and/or in parallel to implement process 800.

At block 802, the process 800 may include generating one or more machine learning models. For example, the machine learning models may utilize predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases, and may be utilized to predict trends and behavior patterns. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models.

At block 804, the process 800 may include collecting transaction data over a period of time. The transaction data may include information associated with payment card transactions, reward amounts, user preferences, settlement amounts, reward amounts in a reward queue, pre-funded wallet metrics, cryptocurrency exchange occurrence and/or rates, metrics on automatic deposits into the exchange platform, metrics on automatic deposits into user wallets, cryptocurrency type selections, earning amounts, and/or any other data described herein.

At block 806, the process 800 may include generating a training dataset from the transaction data. Generation of the training dataset may include formatting the transaction data into input vectors for the machine learning model to intake, as well as associating the various data with the transaction outcomes.

At block 808, the process 800 may include generating one or more trained machine learning models utilizing the training dataset. Generation of the trained machine learning models may include updating parameters and/or weightings and/or thresholds utilized by the models to generate recommendations and/or to perform adjustments of earning amounts as described herein. It should be understood that the trained machine learning models may be configured to determine factors for recommendations associated with adjusted earning amounts, cryptocurrency types, whether to deposit rewards into an exchange platform, products to purchase, payment instruments to use, etc.

At block 810, the process 800 may include determining whether the trained machine learning models indicate improved performance metrics. For example, a testing group may be generated where the outcomes of the recommendations and/or adjustments are known but not to the trained machine learning models. The trained machine learning models may generate the recommendations and/or perform the adjustment operations, which may be compared to the known results to determine whether the results of the trained machine learning model produce a superior result than the results of the machine learning model prior to training.

In examples where the trained machine learning models indicate improved performance metrics, the process 800 may include, at block 812, utilizing the trained machine learning models for generating subsequent results.

In examples where the trained machine learning models do not indicate improved performance metrics, the process 800 may include, at block 814, utilizing the previous iteration of the machine learning models for generating subsequent results. It should be understood that while several examples of how machine learning models may be utilized are described in FIG. 6, the machine learning models may be utilized to perform any of the processes described herein and/or to make any of the determinations described herein.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

determining multiple asset exchanges to be associated with an exchange platform in a computer-centric environment, wherein the multiple asset exchanges are associated with systems that differ from the exchange platform;

generating, by the exchange platform, multiple connections with the multiple asset exchanges such that digital communication between the exchange platform and the multiple connections is secure, wherein:

individual connections of the multiple connections connect the exchange platform with individual asset exchanges of the multiple asset exchanges;

the individual connections enable the digital communication via a high speed wireless communication network;

the individual connections enable the digital communication via a low latency wireless communication network; and the individual connections enable real-time, on-the-fly monitoring of performance rates with the multiple asset exchanges;

accessing a respective order book associated with each of the multiple asset exchanges;

obtaining asset data from each of the respective order books, the asset data including at least one asset identifier associated with an asset type and at least one value associated with the asset type, wherein the asset data is received via multiple data bundles, each of the multiple data bundles containing multiple values associated with multiple assets;

determining that at least one file included within at least one of the multiple data bundles or the multiple values is corrupt;

generating a standard representation of the asset identifier based on the asset type;

identifying a file type associated with the asset data;

applying the file type as an input to a trained machine learning model configured to identify parser patterns to be utilized for parsing reference asset data;

receiving an output from the trained machine learning model based at least in part on the file type;

determining, based at least in part on the output received from the trained machine learning model, a parser pattern to be used for parsing the asset data based at least in part on the file type;

parsing the asset data into one or more data buckets using the parser pattern, wherein each data bucket of the one or more data buckets is associated with a respective standard representation;

reversing a normalization action performed during the parsing to a previous state for at least a portion of the asset data based on the at least one file being corrupt, wherein the previous state is determined based at least in part on the asset type; and causing display in at least near real time of the asset data as parsed such that at least a portion of the asset data is filtered from being displayed based on the parsing.

2. The method of claim 1, further comprising causing the asset data to be presented on a user device.

3. The method of claim 2, further comprising:

receiving a transmission indicating an update to at least one order book;

determining the update is associated with a value change of at least one asset; and presenting the value change of the at least one asset on the user device.

4. The method of claim 1, further comprising:

determining that at least one connection of the multiple connections has failed; and performing, in response to determining that the at least one connection has failed, restoration processes to the at least one connection.

5. The method of claim 1, further comprising:

presenting, via a user device, an option to buy or sell a first asset in exchange for a second asset;

receiving, from the user device, an instruction to buy or sell the first asset in exchange for the second asset;

sending a transmission to at least one asset exchange of the multiple asset exchanges requesting to buy or sell the first asset in exchange for the second asset; and receiving a response from the at least one asset exchange of the multiple asset exchanges confirming a transaction to buy or sell the first asset in exchange for the second asset.

6. A system comprising:

one or more processors; and non-transitory computer-readable media storing instructions that, when executed by the one or more processors, cause the one or more processors to perform operations comprising:

determining multiple asset exchanges to be associated with an exchange platform in a computer-centric environment, wherein the multiple asset exchanges are associated with systems that differ from the exchange platform;

generating, by the exchange platform, multiple connections with the multiple asset exchanges such that digital communication between the exchange platform and the multiple connections is secure, wherein:

individual connections of the multiple connections connect the exchange platform with individual asset exchanges of the multiple asset exchanges;

the individual connections enable the digital communication via a high speed wireless communication network;

the individual connections enable the digital communication via a low latency wireless communication network; and the individual connections enable real-time, on-the-fly monitoring of performance rates with the multiple asset exchanges;

accessing a respective order book associated with each of the multiple asset exchanges;

obtaining asset data from each of the respective order books, the asset data including at least one asset identifier associated with an asset type and at least one value associated with the asset type, wherein the asset data is received via multiple data bundles, each of the multiple data bundles containing multiple values associated with multiple assets;

determining that at least one file included within at least one of the multiple data bundles or the multiple values is corrupt;

generating a standard representation of the at least one asset identifier based on the asset type;

identifying a file type associated with the asset data;

applying the file type as an input to a trained machine learning model configured to identify parser patterns to be utilized for parsing reference asset data;

receiving an output from the trained machine learning model based at least in part on the file type;

determining, based at least in part on receiving the output from the trained machine learning model, a parser pattern to be used for parsing the asset data based at least in part on the file type;

parsing the asset data into one or more data buckets using the parser pattern, wherein each data bucket of the one or more data buckets is associated with a respective standard representation;

reversing a normalization action performed during the parsing to a previous state for at least a portion of the asset data based on the at least one file being corrupt, wherein the previous state is determined based at least in part on the asset type; and causing display in at least near real time of the asset data as parsed such that at least a portion of the asset data is filtered from being displayed based on the parsing.

7. The system of claim 6, wherein the operations further comprise:

receiving, from a user device, a trade request to buy or sell a first asset in exchange for a second asset;

receiving, from the user device, selection of at least one asset exchange of the multiple asset exchanges in which to participate in the trade request;

determining an exchange rate between the first asset and the second asset provided by the at least one asset exchange; and presenting, via the user device, an option to buy or sell the first asset in exchange for the second asset based at least in part on the exchange rate.

8. The system of claim 7, wherein the operations further comprise:

receiving a transmission indicating an update to at least one order book of the at least one asset exchange;

determining the update is associated with the exchange rate offered by the at least one asset exchange; and presenting an updated exchange rate on the user device.

9. The system of claim 6, wherein the operations further comprise presenting, based at least in part on the asset data and via a user device, at least one of:

a portfolio breakdown associated with one or more assets;

a market overview associated with one or more assets;

a correlation matrix associated with one or more assets; or a portfolio position associated with one or more assets.

10. The system of claim 9, wherein the operations further comprise:

receiving a transmission indicating an update to at least one order book of at least one asset exchange;

determining the update is associated with at least one of:

the portfolio breakdown associated with one or more assets;

the market overview associated with one or more assets;

the correlation matrix associated with one or more assets; or the portfolio position associated with one or more assets; and presenting the update on the user device.

11. The system of claim 6, wherein the operations further comprise determining that at least one connection of the multiple connections has failed and performing, in response to determining that the at least one connection has failed, restoration processes to the at least one connection.

12. A method comprising:

determining multiple asset exchanges to be associated with an exchange platform in a computer-centric environment, wherein the multiple asset exchanges are associated with systems that differ from the exchange platform;

generating, by the exchange platform, multiple connections with the multiple asset exchanges such that digital communication between the exchange platform and the multiple connections is secure, wherein:

individual connections of the multiple connections connect the exchange platform with individual asset exchanges of the multiple asset exchanges;

the individual connections enable the digital communication via a high speed wireless communication network; and the individual connections enable the digital communication via a low latency wireless communication network;

receiving, by the exchange platform, asset data from at least one order book associated with at least one of the multiple asset exchanges via the multiple connections between the exchange platform and the at least one asset exchange, wherein the asset data is received via multiple data bundles, each of the multiple data bundles containing multiple values associated with multiple assets;

determining that at least one file included within at least one of the multiple data bundles or the multiple values is corrupt;

generating a standard representation of at least one asset identifier based on an asset type;

identifying a file type associated with the asset data;

applying the file type as an input to a trained machine learning model configured to identify parser patterns to be utilized for parsing reference asset data;

receiving an output from the trained machine learning model based at least in part on the file type;

determining, based at least in part on receiving the output from the trained machine learning model, a parser pattern to be used for parsing the asset data based at least in part on the file type;

parsing the asset data into one or more data buckets using the parser pattern, wherein each data bucket of the one or more data buckets is associated with a respective standard representation;

reversing a normalization action performed during the parsing to a previous state for at least a portion of the asset data based on the at least one file being corrupt, wherein the previous state is determined based at least in part on the asset type; and causing display in at least near real time of the asset data as parsed such that at least a portion of the asset data is filtered from being displayed based on the parsing.

13. The method of claim 12, further comprising:

causing the asset data to be presented on a user device;

receiving a transmission indicating an update to at least one order book;

determining the update is associated with a value change of at least one asset; and presenting the value change of the at least one asset on the user device.

14. The method of claim 12, further comprising determining that the connection has failed and performing, in response to determining that the connection has failed, restoration processes to the at least one connection.

* * * * *